US 11,521,231 B2

(12) United States Patent
Francia et al.

(10) Patent No.: US 11,521,231 B2
(45) Date of Patent: Dec. 6, 2022

(54) FRAUD PREVENTION IN PROGRAMMATIC ADVERTISING

(71) Applicant: Kubient Inc., New York, NY (US)

(72) Inventors: Christopher Francia, Valhalla, NY (US); Vasanti Mahajan, Harrison, NJ (US)

(73) Assignee: Kubient Inc., New York, NY (US)

( * ) Notice: Subject to any disclaimer, the term of this patent is extended or adjusted under 35 U.S.C. 154(b) by 17 days.

(21) Appl. No.: 17/017,571

(22) Filed: Sep. 10, 2020

(65) Prior Publication Data
US 2021/0073855 A1    Mar. 11, 2021

Related U.S. Application Data

(60) Provisional application No. 62/898,271, filed on Sep. 10, 2019.

(51) Int. Cl.
*G06Q 30/02* (2012.01)
*G06Q 30/00* (2012.01)
*G06F 9/54* (2006.01)
*G06N 20/00* (2019.01)

(52) U.S. Cl.
CPC ......... *G06Q 30/0248* (2013.01); *G06F 9/541* (2013.01); *G06N 20/00* (2019.01); *G06Q 30/0185* (2013.01); *G06Q 30/0275* (2013.01); *G06Q 30/0277* (2013.01)

(58) Field of Classification Search
CPC .......... G06Q 30/0248; G06Q 30/0185; G06Q 30/0275; G06Q 30/0277; G06F 9/541; G06N 20/00
USPC ..................................................... 705/14.47
See application file for complete search history.

(56) References Cited

U.S. PATENT DOCUMENTS

2019/0230122 A1*  7/2019  Chin ....................... H04L 41/16

FOREIGN PATENT DOCUMENTS

JP         2016177600 A  *  10/2016

OTHER PUBLICATIONS

TJ Horan, 5 Keys to Using AI and Machine Learning in Fraud Detection, 2018 (Year: 2018).*

* cited by examiner

*Primary Examiner* — Tarek Elchanti
(74) *Attorney, Agent, or Firm* — Haug Partners LLP

(57) ABSTRACT

Embodiments of the present invention provide for machine learning-based systems and methods for preventing fraud in programmatic advertising. The systems and methods provide for applying a plurality of machine learning models to data associated with a bid request, determining if the bid request is associated with fraudulent activity as a result of the machine learning models, and selectively preventing the bid request from being provided to potential buyers based on the determination.

18 Claims, 4 Drawing Sheets

Process 100

FRAUD PREVENTION IN PROGRAMMATIC ADVERTISING

CROSS-REFERENCE TO RELATED APPLICATION

This application claims the benefit of U.S. Provisional Patent Application No. 62/898,271, which was filed on Sep. 10, 2019 and is incorporated by reference in its entirety.

FIELD OF THE INVENTION

The present disclosure relates to machine learning-based systems and methods for preventing fraud in programmatic advertising.

BACKGROUND OF THE INVENTION

Programmatic advertising corresponds to the automated process of buying and selling digital advertising inventory, e.g., display ads, on a website, mobile application, Internet-connected television, or other Internet-connected devices. Specifically, the digital advertising inventory is bought and sold using a real-time bidding system so that a particular advertiser, e.g., a buyer, can purchase advertising inventory on a particular website, e.g., seller, in order to display their advertisement on that website in real-time. Different buyers are able to bid on the advertising inventory based on particular information provided by the seller, i.e., a bid request. Bid requests are generated after a particular user access a website and include a lot of different valuable information about the website, the user(s) accessing the website, as well as the advertising inventory on the website. The bid request is then transmitted from the seller's website to an ad exchange, which shares the bid request information with potential buyers. The buyer with the highest bid is then able to buy the advertising inventory and, therefore, display their advertisement on the seller's website in real-time.

However, the automated nature of programmatic advertising also leaves it susceptible to fraud. For example, the advertising inventory can be part of a fraudulent scheme associated with at least one of bots, malware, spammers, phishers, known attackers, crawlers, datacenters, ransomware, anonymizers, compromised systems, etc. Further, because the bidding process is usually completed within 300 milliseconds, buyers are unaware that they bought fraudulent advertising inventory until it is too late.

As such, it would be desirable to have systems and methods that could overcome these and other deficiencies of known systems.

SUMMARY OF THE INVENTION

Embodiments of the present invention relate to machine learning-based systems and methods for preventing fraud in programmatic advertising.

According to an embodiment, a system for preventing fraud in programmatic advertising can include: at least one server comprising a memory, a processor, and a representational state transfer application programming interface (RESTful API), wherein the at least one server is configured to: retrieve a first set of data from a bid request; apply features to the first set of data; extract a second set of data based on the applied features; apply a first set of machine learning models to the second set of data; apply a second set of machine learning models to the second set of data, wherein the second set of machine learning models is different from the first set of machine learning models; determine if the bid request is associated with at least one fraudulent activity based on a result from applying at least one of the first set of machine learning models and the second set of machine learning models to the second set of data; and selectively prevent the bid request from being provided to at least one buyer based on the determination.

According to another embodiment, a system for preventing fraud in programmatic advertising can include: at least one server comprising a memory, a processor, and a RESTful API, wherein the at least one server is configured to: apply a first set of machine learning models to data associated with a bid request; apply a second set of machine learning models to the data associated with the bid request, wherein the second set of machine learning models is different from the first set of machine learning models; determine if the bid request is associated with at least one fraudulent activity based on a result from applying at least one of the first set of machine learning models and the second set of machine learning models to the data associated with a bid request; and selectively prevent the bid request from being provided to at least one buyer based on the determination.

According to an embodiment of the invention, a method for preventing fraud in programmatic advertising can include: retrieving a first set of data from a bid request; applying features to the first set of data; extracting a second set of data based on the applied features; applying a first set of machine learning models to the second set of data; applying a second set of machine learning models to the second set of data, wherein the second set of machine learning models is different from the first set of machine learning models; determining if the bid request is associated with at least one fraudulent activity based on a result from applying at least one of the first set of machine learning models and the second set of machine learning models to the second set of data; and selectively preventing the bid request from being provided to at least one buyer based on the determination.

Further, embodiments of the invention can provide the following advantages: (i) a server-based solution, (ii) the checking of the live bid request data in addition to static data at the time the bid request is received, (iii) extremely low latency and cost, as well as (iv) a high level of accuracy. Further, the invention can be used to detect, among other things, bots, malware, spammers, phishers, known attackers, crawlers, datacenters, ransomware, anonymizers, and compromised systems. Further, with the invention, advertising inventory fraud can be detected and prevented within the critical 300 millisecond window of time before a buyer, e.g., an advertiser, spends their budget.

These and other advantages will be described more fully in the following detailed description.

BRIEF DESCRIPTION OF THE DRAWINGS

Some aspects of the disclosure are herein described, by way of example only, with reference to the accompanying drawings. With specific reference now to the drawings in detail, it is stressed that the particulars shown are by way of example and are for purposes of illustrative discussion of embodiments of the disclosure. In this regard, the description, taken with the drawings, makes apparent to those skilled in the art how aspects of the disclosure may be practiced.

DETAILED DESCRIPTION

Figure 1:
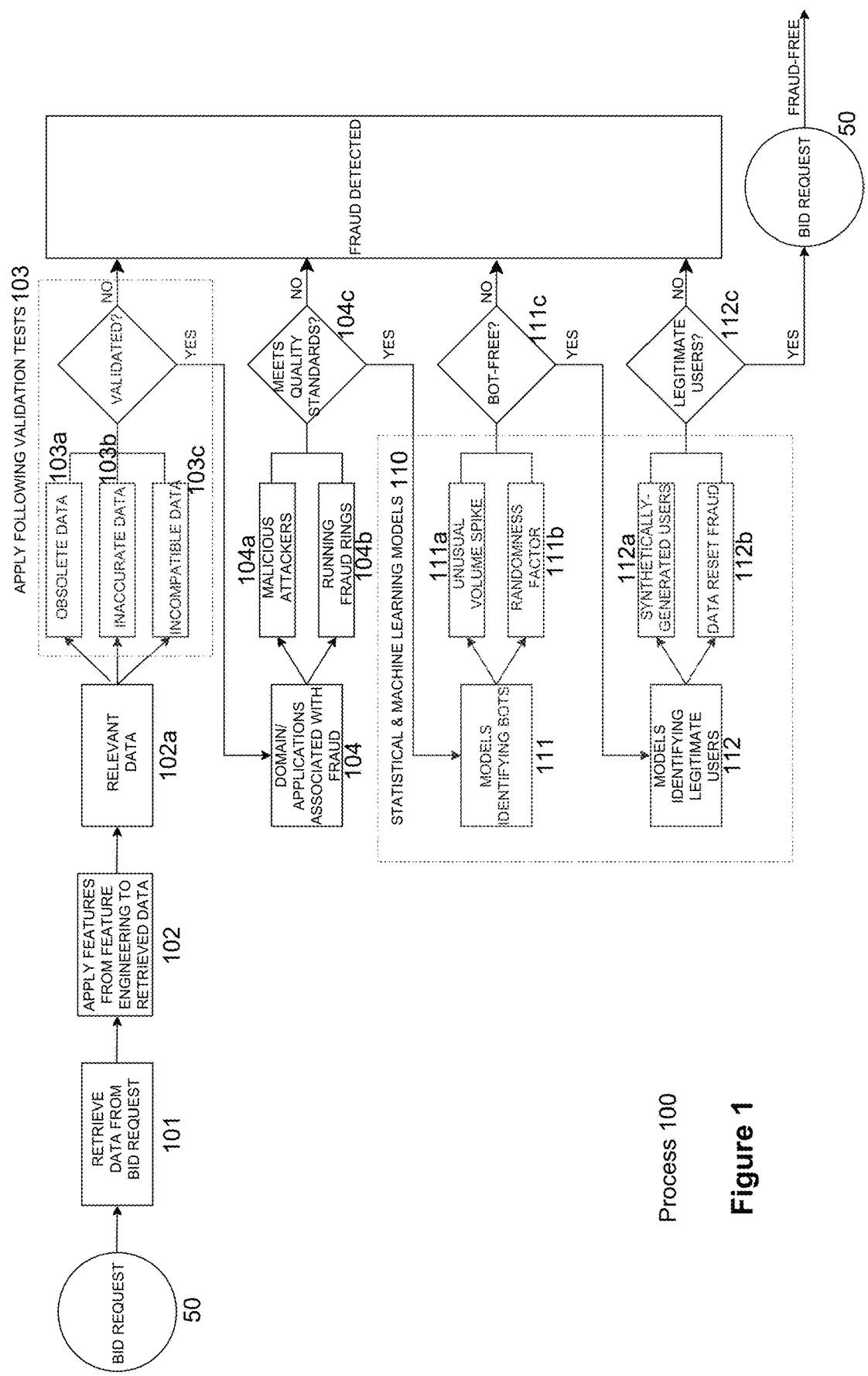
FIG. 1 depicts a flow diagram for preventing fraud in programmatic advertising according to exemplary embodiment of the invention.

This description is not intended to be a detailed catalog of all the different ways in which the disclosure may be implemented, or all the features that may be added to the instant disclosure. For example, features illustrated with respect to one embodiment may be incorporated into other embodiments, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. In other instances, well-known structures, interfaces, and processes have not been shown in detail in order not to unnecessarily obscure the invention. It is intended that no part of this specification be construed to affect a disavowal of any part of the full scope of the invention. Hence, the following descriptions are intended to illustrate some particular embodiments of the disclosure, and not to exhaustively specify all permutations, combinations and variations thereof.

Unless explicitly stated otherwise, the definition of any term herein is solely for identification and the reader's convenience; no such definition shall be taken to mean that any term is being given any meaning other than that commonly understood by one of ordinary skill in the art to which this disclosure belongs, unless the definition herein cannot reasonably be reconciled with that meaning. Further, in the absence of such explicit definition, all technical and scientific terms used herein have the same meaning as commonly understood by one of ordinary skill in the art to which this disclosure belongs. The terminology used in the description of the disclosure herein is for the purpose of describing particular embodiments only and is not intended to be limiting of the disclosure.

Unless the context indicates otherwise, it is specifically intended that the various features of the disclosure described herein can be used in any combination. Moreover, the present disclosure also contemplates that in some embodiments of the disclosure, any feature or combination of features set forth herein can be excluded or omitted.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

As used in the description of the disclosure and the appended claims, the singular forms "a", "an", and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

FIG. 1 depicts a flow diagram for preventing fraud in programmatic advertising according to exemplary embodiment of the invention. In particular, FIG. 1 depicts a process 100 for preventing fraud in programmatic advertising. As depicted in the figure, in a first step 101, a first set of data is retrieved from a bid request 50. The first set of data can include information about the website/mobile application/Internet-connected device from which the bid request 50 was generated, the user(s) accessing the website/mobile application/Internet-connected device, and the available advertising inventory on the website/mobile application/Internet-connected device. The first set of data can include an Internet Protocol (IP) address, user agent, domain, bundle identification (bundle ID), ad request type, device identification (device ID), ad request channel, latitude, longitude, and other identifications (IDs) related to internal systems.

Then, in step 102, features which were created with featuring engineering (which will be described in greater detail below) are applied to extract a second set of data, e.g., relevant data, from the first set of data, as depicted with step 102a. In particular, data points are mapped to an internal data structure, and classified by data type such as string, integer, float, etc. Further, the fields can be reformatted, and metadata can be added to better classify the data.

The second set of data can then be put through a plurality of validations tests 103 to determine if the bid request 50 includes at least one of obsolete data, inaccurate data, and/or incompatible data. Specifically, each of an obsolete data validation test 103a, an inaccurate data validation test 103b, and an incompatible data test 103c can be applied to the second set of data to determine if the bid request 50 includes at least one of obsolete data, inaccurate data, and/or incompatible data, respectively.

According to an embodiment, the obsolete data validation test 103a can test for obsolete data by comparing the data in the second set of data to a list of data previously-determined to include either obsolete data and/or up-to-date data. The data in the second set of data that is being compared can include all the data from the first set of data that is not data-generated internally by the system such as: IP address, user agent, domain, bundle ID, ad request type, device ID, ad request channel, latitude and longitude. As such, if the second set of data includes data similar to the previously-determined obsolete data or does not include data similar to the previously-determined up-to-date data, then it can be determined that the second set of data includes obsolete data, and vice-versa.

Further, according to an embodiment, the inaccurate data validation test 103b can test for inaccurate data by comparing the data in the second set of data to a list of data previously-determined to include either inaccurate data and/or accurate data. The data in the second set of data that is being compared can include all the data from the first set of data that is not data generated internally by the system such as: IP address, user agent, domain, bundle ID, ad request type, device ID, ad request channel, latitude and longitude. As such, if the second set of data includes data similar to the previously-determined inaccurate data or does not include data similar to the previously-determined accurate data, then it can be determined that the second set of data includes inaccurate data, and vice-versa.

Further, according to an embodiment, the incompatible data validation test 103c can test for incompatible data by comparing the data in the second set of data to a list of data previously-determined to include either incompatible data and/or compatible data. The data in the second set of data that is being compared can include all the data from the first set of data that is not data generated internally by the system such as: IP address, user agent, domain, bundle ID, ad request type, device ID, ad request channel, latitude and longitude. As such, if the second set of data includes data similar to the previously-determined incompatible data or does not include data similar to the previously-determined compatible data, then it can be determined that the second set of data includes incompatible data, and vice-versa.

Further, according to an embodiment, each of the obsolete data validation test 103a, the inaccurate data validation test 103b, and the incompatible data test 103c can be implemented with corresponding software. In this regard, if it is determined that the bid request 50 includes at least one of obsolete data, inaccurate data, and/or incompatible data, then it is likely that the bid request 50 is associated with fraudulent data and, therefore, should not be provided to potential buyers. Further, information indicating that the bid request 50 includes fraudulent data can be provided to at least one of the seller and/or the potential buyers. As such, a report can be provided indicating that the bid request 50 includes fraudulent data, thereby preventing the potential buyers from placing a bid on the advertising inventory associated with the bid request 50. Otherwise, if it is determined that the bid request 50 does not include any of obsolete data, inaccurate data, and incompatible data, then the process can proceed to step 104.

In step 104, the second set of data is compared to a list of known fraudulent and/or malicious domains/applications associated with at least one of the following activities: malware (e.g., device has or is currently being used to distribute known malware/spyware or adware to other systems; also can be a device that has been compromised as part of a larger malicious network attack), potential malware (e.g., user/device has engaged in behavior similar to malware-infected machines, but no currently-known malware is detected), known attacker (e.g., user/device has knowingly engaged in cyber attacks on various systems), known bad reputation (e.g., user/device has displayed conduct that is malicious in nature, such as hate speech, bot net participation, dark web participation, and other activities deemed unlawful or malicious), spammer (e.g., user/device engaged in unsolicited and repeated messages via email, message boards, forums, or chat groups; high indicator that system is compromised and possibly influenced by a bot net), anonymizer (e.g., user/device levied a masking service to prevent tracking, and other identifiers, i.e., proxies, tor, etc.), datacenter (e.g., IP address resolved to a datacenter, as such no user information could be determined and high likelihood of spoofing or man-in-the-middle attacks), suspicious domain (e.g., domain has been registered or utilized by malicious attacker to conduct cybercrime activities), compromised device (e.g., device has been compromised, either by malware or other software that is not under exclusive control of software, i.e., may contain key loggers or other capturing software), suspicious activity (e.g., general activity is similar to activity of other categories indicating that the user is much higher risk), crawler (e.g., user is known web crawler and not a human), pornography (e.g., device has engaged in viewing or distributing child pornography), and phishing (e.g., device/user has engaged in phishing attempts via email or the web). The data in the second set of data that is being compared can include IP address, user agent, domain, bundle ID, ad request type, device ID, ad request channel, latitude and longitude. As such, based on the comparisons in step 104, it can then be determined if the user and/or device associated with the bid request 50 is associated with known malicious attackers, as depicted in step 104a, or if it's associated with known fraud rings, as depicted in step 104b. Then, based on steps 104, 104a, and 104b, it can be determined if the bid request 50 meets quality standards, as depicted in FIG. 104c. Further, according to an embodiment, each of the steps 104, 104a, 104b, and 104c can be implemented with corresponding software. In this regard, if it is determined that the bid request 50 is associated with one of the known fraudulent activities described above, then the bid request 50 does not meet quality standards and, therefore, should not be provided to potential buyers. Further, information indicating that the bid request 50 is associated with fraudulent activities can be provided to at least one of the seller and/or the potential buyers. As such, a report can be provided indicating that the bid request 50 is associated with fraudulent activities, thereby preventing the potential buyers from placing a bid on the advertising inventory associated with the bid request. Otherwise, if it is determined that the bid request 50 does meet quality standards, then the process can proceed to step 110.

As depicted in the figure, during step 110, a plurality of statistical and machine learning models are applied to the second set of data to determine if the bid request 50 is associated with other forms of fraudulent activity. For example, in an embodiment, a first set of machine learning models 111 can be applied to the second set of data to determine if the bid request 50 is associated with a bot. In particular, a machine learning model testing unusual volume spikes, e.g., machine learning model 111a, and machine learning model testing a randomness factor, e.g., machine learning model 111b, can be applied to all of the data in the second set of data. With regard to model 111a, if the model determines an unusual volume spike associated with the user, that may indicate that the user is a bot. In particular, a statistical model in the machine learning reads the ingested data, and compares the data to normal traffic patterns to determine if the input data is within the normal ratio or outside it. If it occurs outside the normal ratio, the model determines that such input data is a type of traffic fraud. Similarly, if the model 111b determines a low level of randomness, that may also indicate that the user is a bot. According to an embodiment, the randomness of the user can be determined based on one or more entropy algorithms. As such, based on the results from the machine learning models 111a and 111b, it can be determined in step 111c if the bid request 50 is associated with a bot. According to an embodiment, step 111c can be implemented with corresponding software. In this regard, if it is determined that the bid request 50 is associated with a bot, then the bid request 50 should not be provided to potential buyers. Further, information indicating that the bid request 50 is associated with a bot can be provided to at least one of the seller and/or the potential buyers. As such, a report can be provided indicating that the bid request 50 is associated with a bot, thereby preventing the potential buyers from placing a bid on the advertising inventory associated with the bid request

50. Otherwise, if it is determined that the bid request 50 is not associated with a bot (i.e., bot-free), then the process can proceed to a second set of machine learning models 112.

As depicted in the figure, the second set of machine learning models 112 can be applied to the second set of data to determine if the bid request 50 is associated with identifiable legitimate users. In particular, a machine learning model testing if there are synthetically generated users, e.g., machine learning models 112*a*, and a machine learning model testing data reset fraud, e.g., machine learning model 112*b*, can be applied to the second set of data. In particular, statistical models in the machine learning read the ingested data, and compare the data to normal device patterns to determine if the input data is within the normal ratio or outside it. If it occurs outside the normal ratio, the models determine such input data is a type of device fraud. In this regard, if the model 112*a* determines that users were synthetically generated, that may indicate that the users were not legitimate. Similarly, if the model 112*b* determines that there was data reset fraud, that may also indicate that the users were not legitimate. As such, based on the results from the machine learning models 112*a* and 112*b*, it can be determined in step 112*c* if the bid request 50 is associated with legitimate users. According to an embodiment, step 112*c* can be implemented with corresponding software. In this regard, if it is determined that the bid request 50 is not associated with legitimate users, then the bid request 50 should not be provided to potential buyers. Further, information indicating that the bid request 50 is not associated with legitimate users can be provided to at least one of the seller and/or the potential buyers. As such, a report can be provided indicating that the bid request 50 is not associated with legitimate users, thereby preventing the potential buyers from placing a bid on the advertising inventory associated with the bid request 50. Otherwise, if it is determined that the bid request 50 is associated with legitimate users, then it can be finally determined that the bid request 50 is fraud-free and, therefore, can be provided to potential buyers for bidding on the advertising inventory.

Further, according to another embodiment, the machine learning models 111 and 112 can be applied directly to the second set of data after steps 102*a*, thereby skipping tests 103 and steps 104, 104*a*, 104*b*, and 104*c*. Further, in another embodiment, each of (i) tests 103, (ii) steps 104, 104*a*, 104*b*, and 104*c*, (iii) machine learning models 111, and (iv) machine learning models 112 can be performed simultaneously.

According to an embodiment, the process 100 can be performed by one or more servers, as described in further detail below. Further, according to an embodiment, each of (i) the detection and prevention of advertising inventory fraud as well as (ii) the confirmation that no fraud exists can be determined within the critical 300 millisecond window of time before a buyer, e.g., an advertiser, spends their budget. In particular, by analyzing the bid request 50 data with machine learning algorithms during the process, artificial intelligence can be leveraged to detect patterns of fraud, and do so quickly and in parallel with bid request processing of the partner system, thus allowing the detection and prevention to occur within the 300 millisecond window.

Further, according to an embodiment, a report summary may be provided by the process 100 indicating which, if any, tests (e.g., validation, quality standard, bot-free, legitimate user) the bid request 50 failed. In this regard, the report summary may also include a corresponding score/grade based on the particular failed test. Further, the report summary can also include a score/grade if the bid request 50 passed all of the tests.

Figure 2:
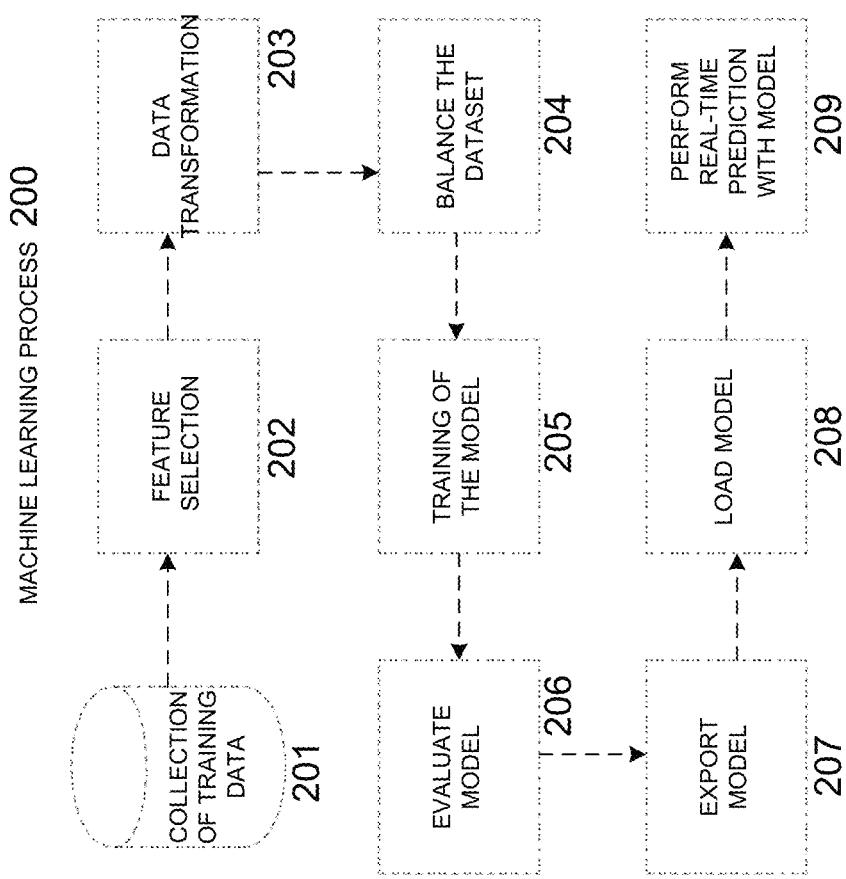
FIG. 2 depicts a machine learning process for training the models in FIG. 1 according to an exemplary embodiment of the invention.

FIG. 2 depicts a machine learning process for training the models in FIG. 1 according to an exemplary embodiment of the invention. In particular, the figure depicts a process 200 for training one of the machine learning models described above, e.g., the first set of machine learning models 111 and the second set of machine learning models 112. According to an embodiment, in a first step 201, a training dataset is collected for training the machine learning model. Each model is trained on data specific to the desired outcome. For instance, for detecting IP Address rotation fraud, the following data points can be used: IP address, latitude, longitude, DNS, frequency of occurrence, operating system, platform/browser, device, user agent, user ID, domain, bundle ID, IFA, and other internal IDs. Then, in step 202, features are selected from the training dataset in order to use in the construction of the machine learning model. Each model selects the fields that are appropriate for the desired outcome. For example, for IP address rotation fraud, those fields would be selected based on an association/relationship to the predicting variable. For instance, while the field domain may be in the training data set, it may not have an association/relationship to the predicting variable as the IP Address rotation fraud is not tied to a specific domain. Thus, the domain would not be needed in the final usage of the statistical model. Then, in step 203, the training data set is transformed into a format that is more conducive for training the machine learning model. In particular, each model will convert the data in to a more native format for the desired outcome. For IP Address rotation fraud, this could be converting the data fields into label-associated integer values (e.g., 1, 2, 3, 4, etc.), where each number can represent the unique field and value. Then, in step 204, the ratio between the "fraud" and "not fraud" classes is balanced, if necessary. According to an embodiment, the model must have data that is a random sample, but is not weighted in any particular direction to avoid accuracy issues. This can be done by mapping out the data and ensuring all clusters of data points are evenly distributed. If they are not, data is either removed or added until such balance is achieved. Then, in step 205, the machine learning model is trained using the training dataset. According to an embodiment, the machine learning model can be one of a logistic regression algorithm, an expectation-maximization algorithm, or any other known machine learning model. Then, in step 206, the trained machine learning model is evaluated against testing data. Then, in step 207, the machine learning model is exported to the server in which it will be implemented. Then, in step 208, the machine learning model is loaded onto that server. Finally, in step 209, the machine learning model can be used to perform real-time predictions, e.g., predicting unusual volume spikes (e.g., machine learning model 111*a*), predicting a randomness factor (e.g., machine learning model 111*b*), predicting if there were synthetically-generated users (e.g., machine learning models 112*a*), predicting data reset fraud (e.g., machine learning model 112*b*), etc. According to an embodiment, models are re-trained on new data to improve accuracy. In this regard, the models are configured to receive corrections in order to address false positives and/or false negatives in their predictions. According to an embodiment, these corrections can be made by users that can label the new training data and then retrain the model with the updated information.

Figure 3A:
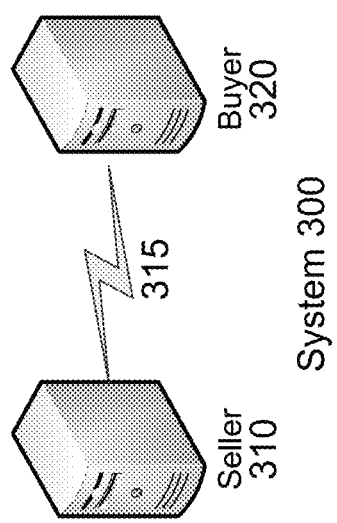
FIG. 3A depicts a system for preventing fraud in programmatic advertising according to exemplary embodiment of the invention.

FIG. 3A depicts a system for preventing fraud in programmatic advertising according to exemplary embodiment of the invention. According to an embodiment, a system 300 can include a seller-side server 310, at least one buyer-side server 320, and a communication network 315 connecting the seller-side server 310 and the at least one buyer-side server 320.

According to an embodiment, the process 100 can be implemented in at least one of the seller-side server 310 and the buyer-side server 320. For example, in a first embodiment, the process 100 can be performed completely in the seller-side server 310. In this regard, the bid request 50 can be generated by a website/mobile application/Internet-connected device on the seller-side server 310 and then, based on the process 100, the seller-side server 310 can determine if the bid request 50 is fraud-free before it's provided to the potential buyer for bidding on the at least one buyer-side server 320. In a second embodiment, the process 100 can be performed completely in the buyer-side server 320. In this regard, after the bid request 50 is generated by the website/mobile application/Internet-connected device on the seller-side server 310, it can then be provided to the at least one buyer-side server 320, where the at least one buyer-side server 320 performs the process 100 on the bid request 50 to determine if it's fraud-free before providing it to the potential buyers. In a third embodiment, the process 100 can be performed partially on the seller-side server 310 and then partially on the buyer-side server 320. In this regard, after the bid request 50 is generated by the website/mobile application/Internet-connected device on the seller-side server 310, the seller-side server 310 can perform a first part of the process 100 and then transmit relevant data to the at least one buyer-side server 320 to perform a second part.

Further, according to an embodiment, the communications network 315 can include, or can interface to, at least one of the Internet, an intranet, a local area network (LAN), a wide area network (WAN), a metropolitan area network (MAN), a storage area network (SAN), a frame relay connection, an advanced intelligent network (AIN) connection, a synchronous optical network (SONET) connection, a digital T1, T3, E1 or E3 line, a digital data service (DDS) connection, a digital subscriber line (DSL) connection, an Ethernet connection, an integrated services digital network (ISDN) line, a dial-up port such as a V.90, a V.34 or a V.34bis analog modem connection, a cable modem, an asynchronous transfer mode (ATM) connection, a fiber distributed data interface (FDDI) connection, a copper distributed data interface (CDDI) connection, or an optical/DWDM network. In another embodiment, the communications network 315 can include, or can interface to, at least one of wireless application protocol (WAP) link, a Wi-Fi link, a microwave link, a general packet radio service (GPRS) link, a global system for mobile Communication (GSM) link, a Code Division Multiple Access (CDMA) link or a time division multiple access (TDMA) link such as a cellular phone channel, a GPS link, a cellular digital packet data (CDPD) link, a Research in Motion, Limited (RIM) duplex paging type device, a Bluetooth radio link, or an IEEE 802.11-based radio frequency link. Further, in another embodiment, the communications network 315 can include, or can interface to, at least one of an RS-232 serial connection, an IEEE-1394 (FireWire) connection, a Fibre Channel connection, an infrared (IrDA) port, a small computer systems interface (SCSI) connection, a universal serial bus (USB) connection or another wired or wireless, digital or analog interface or connection.

Figure 3B:
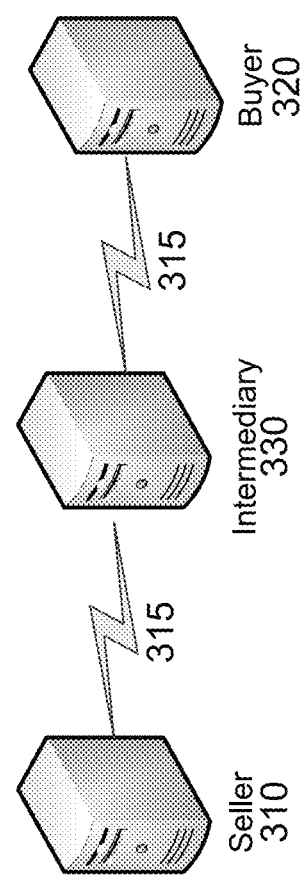
FIG. 3B depicts a system for preventing fraud in programmatic advertising according to another exemplary embodiment of the invention.

FIG. 3B depicts a system for preventing fraud in programmatic advertising according to another exemplary embodiment of the invention. As depicted in the figure, the system 300 can also include an intermediary server 300. In this regard, the intermediary server 300 can perform at least part or all of the process 100. For example, in a first embodiment, after the bid request 50 is generated by the website/mobile application/Internet-connected device on the seller-side server 310, it can then be provided to the intermediary server 330, where the intermediary server 330 performs the process 100 on the bid request 50 to determine if it's fraud-free before providing it to the potential buyers on the at least one buyer-side server 320. Further, in a second embodiment, after the bid request 50 is generated by the website/mobile application/Internet-connected device on the seller-side server 310, it can then be provided to the intermediary server 330, where the intermediary server 330 perform a first part of the process 100 and then transmits the relevant data to the at least one buyer-side server 320 so it can perform a second part. Lastly, in a third embodiment, after the bid request 50 is generated by the website/mobile application/Internet-connected device on the seller-side server 310, the seller-side server 310 can then perform a first part of the process 100 and then relevant data may be sent to the intermediary server 330 and the at least one buyer-side server 320 so that they can perform the second and third parts, respectively.

Figure 4B:
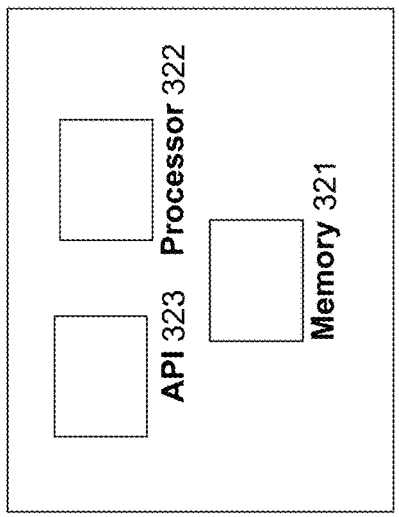
FIG. 4B depicts a buyer-side server according to an exemplary embodiment of the invention.
Figure 4C:
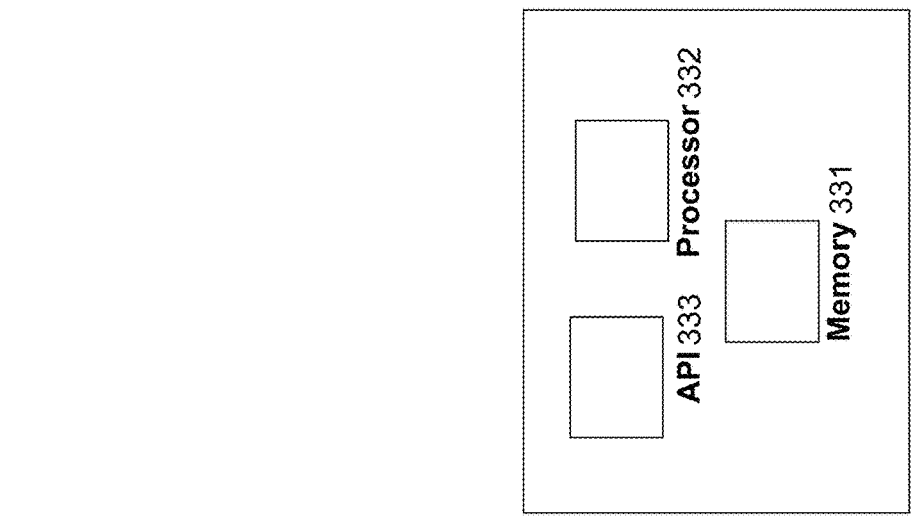
FIG. 4C depicts an intermediary server according to an exemplary embodiment of the invention.
Figure 4A:
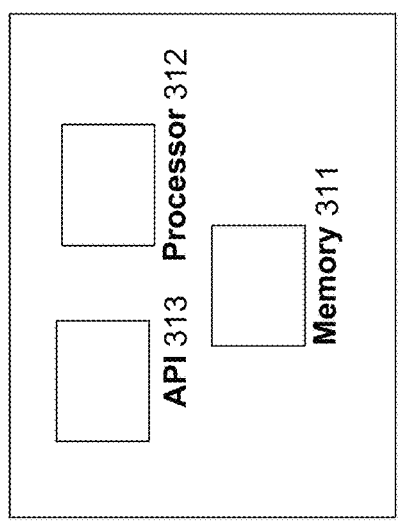
FIG. 4A depicts a seller-side server according to an exemplary embodiment of the invention.

FIGS. 4A-4C depicts the seller-side, buyer-side, and intermediary servers, respectively. As depicted in the figures, each of the seller-side server 310, buyer-side server 320, and intermediary server 330 include a respective memory (e.g., memories 311, 321, and 331), processor (e.g., processors 312, 322, and 332), and representational state transfer application programming interface (RESTful API) (e.g., APIs 313, 323, and 333). According to an embodiment, the memories 311, 321, and 331 can be used to store computer instructions and data including any and all forms of non-volatile memory, including semiconductor devices (e.g., SRAM, DRAM, EPROM, EEPROM, and flash memory devices), magnetic disks (e.g., internal hard disks or removable disks), magneto-optical disks, and CD-ROM and DVD-ROM disks. Further, the processors 312, 322, and 332 can be suitable for the execution of a computer program, e.g., part or all of the process 100, and can include both general and special purpose microprocessors, as well as any one or more processors of any kind of digital computer. Further, the processors 312, 322, and 332 can receive instructions and data from the memories 311, 321, and 331, e.g., to carry out at least part or all of the process 100. Further, the APIs 313, 323, and 333 can be used to transmit relevant data, e.g., the bid request 50, the first set of data, the second set of data, to and from the servers 310, 320, and 330. The APIs 313, 323, and 333 run on a local machine port, e.g., TCP or UDP port, of the server/computer which hosts them. The machine port is configured to receive requests from other applications on the computer. The other applications can send relevant data to process 100 via the APIs 313, 323, and 333, and then await a response from the process 100 on the same port.

It is to be understood that the above described embodiments are merely illustrative of numerous and varied other embodiments which may constitute applications of the principles of the invention. Such other embodiments may be readily devised by those skilled in the art without departing from the spirit or scope of this invention and it is our intent they be deemed within the scope of our invention.

The foregoing detailed description of the present disclosure is to be understood as being in every respect illustrative and exemplary, but not restrictive, and the scope of the present disclosure provided herein is not to be determined solely from the detailed description, but rather from the claims as interpreted according to the full breadth and scope permitted by patent laws. It is to be understood that the embodiments shown and described herein are merely illustrative of the principles addressed by the present disclosure and that various modifications may be implemented by those skilled in the art without departing from the scope and spirit of the present disclosure. Those skilled in the art may implement various other feature combinations without departing from the scope and spirit of the present disclosure. The various functional modules shown are for illustrative purposes only, and may be combined, rearranged and/or otherwise modified.

The invention claimed is:

1. A computer-implemented method for preventing fraud in programmatic advertising, the method comprising:
   retrieving a first set of data from a bid request;
   applying features to the first set of data;
   extracting a second set of data based on the applied features;
   applying a first set of machine learning models to the second set of data;
   applying a second set of machine learning models to the second set of data, wherein the second set of machine learning models is different from the first set of machine learning models, wherein the first and second sets of machine learning models are: (i) trained on respective training data sets and (ii) re-trained on updated information, wherein at least one of the first and second sets of machine learning models is configured to predict at least one fraudulent activity;
   determining if the bid request is associated with the at least one fraudulent activity based on a result from applying at least one of the first set of machine learning models and the second set of machine learning models to the second set of data; and
   selectively preventing the bid request from being provided to at least one buyer based on the determination.

2. The method of claim 1, wherein the first set of data includes at least one of an Internet Protocol address, a user agent, a domain, a bundle identification, an ad request type, a device identification, an ad request channel, a latitude, and a longitude.

3. The method of claim 1, wherein the second set of data is classified by data types, wherein the data types include string, integer, and float.

4. The method of claim 1, wherein the first set of machine learning models includes: (i) a machine learning model testing for unusual volume spikes and (ii) a machine learning model testing for a randomness factor.

5. The method of claim 1, wherein the second set of machine learning models includes: (i) a machine learning model testing for synthetically-generated users and (ii) a machine learning model testing for data reset fraud.

6. The method of claim 1, wherein the bid request is associated with at least one advertising inventory on a one of a web site, a mobile application, and an Internet-connected device.

7. The method of claim 6, wherein the at least one advertising inventory is a display ad on the one of the website, the mobile application, and the Internet-connected device.

8. The method of claim 1, further comprising:
   applying at least one validation test to the second set of data, wherein the at least one validation test includes at least one of an obsolete data test, an inaccurate data test, and an incompatible data test;
   determining if the bid request is associated with the at least one fraudulent activity based on a result from applying the at least one validation test; and
   selectively preventing the bid request from being provided to the at least one buyer based on the determination.

9. The method of claim 1, further comprising:
   comparing the second set of data to a list of known fraudulent domains and/or applications;
   determining if the bid request is associated with the at least one fraudulent activity based on the comparison; and
   selectively preventing the bid request from being provided to the at least one buyer based on the determination.

10. A computer-implemented system for preventing fraud in programmatic advertising, the system comprising:
    at least one server comprising a memory, a processor, and a representational state transfer application programming interface (RESTful API), wherein the at least one server is configured to:
    retrieve a first set of data from a bid request;
    apply features to the first set of data;
    extract a second set of data based on the applied features;
    apply a first set of machine learning models to the second set of data;
    apply a second set of machine learning models to the second set of data, wherein the second set of machine learning models is different from the first set of machine learning models, wherein the first and second sets of machine learning models are: (i) trained on respective training data sets and (ii) re-trained on updated information, wherein at least one of the first and second sets of machine learning models is configured to predict at least one fraudulent activity;
    determine if the bid request is associated with the at least one fraudulent activity based on a result from applying at least one of the first set of machine learning models and the second set of machine learning models to the second set of data; and
    selectively prevent the bid request from being provided to at least one buyer based on the determination.

11. The system of claim 10, wherein the bid request is associated with at least one advertising inventory on a website, a mobile application, and an Internet-connected device.

12. The system of claim 11, wherein the at least one advertising inventory is a display ad on the one of the website, the mobile application, and the Internet-connected device.

13. The system of claim 10, wherein the bid request is transmitted from another server.

14. The system of claim 10, wherein the RESTful API is configured to run on a machine port of a computer.

15. The system of claim 14, wherein the RESTful API is configured to receive the bid request on the machine port.

16. The system of claim 15, wherein the RESTful API is configured to receive the bid request from at least one other application on the computer.

17. A system for preventing fraud in programmatic advertising, the system comprising:
    at least one server comprising a memory, a processor, and a representational state transfer application programming interface (RESTful API), wherein the at least one server is configured to:

apply a first set of machine learning models to data associated with a bid request;

apply a second set of machine learning models to the data associated with the bid request, wherein the second set of machine learning models is different from the first set of machine learning models, wherein the first and second sets of machine learning models are: (i) trained on respective training data sets and (ii) re-trained on updated information, wherein at least one of the first and second sets of machine learning models is configured to predict at least one fraudulent activity;

determine if the bid request is associated with the at least one fraudulent activity based on a result from applying at least one of the first set of machine learning models and the second set of machine learning models to the data associated with a bid request; and selectively prevent the bid request from being provided to at least one buyer based on the determination.

18. The system of claim 17, wherein the bid request is associated with at least one advertising inventory on a web site, a mobile application, and an Internet-connected device.

* * * * *